Patented Sept. 14, 1954

2,689,256

UNITED STATES PATENT OFFICE 2,689,256

SULFONIC ACID ESTERS OF HYDROXY SUBSTITUTED NAPHTHALENES

Angelo J. Speziale and Ferdinand Clark Meyer, Kirkwood, Mo., assignors to Monsanto Chemical Company, St. Louis, Mo., a corporation of Delaware No Drawing. Application October 31, 1952, Serial No. 318,076

14 Claims. (Cl. 260—456)

This invention relates to new and useful sulfonic acid esters of hydroxy substituted naphthalenes. More specifically this invention relates to sulfonic acid esters of 1-hydroxy-4-keto-2-alkoxy-4a-methyl-1,4,4a,5,8,8a-hexahydronaphthalenes, which keto-esters may be represented by the structural formula

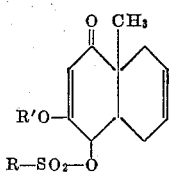

where R is an aromatic radical, such as phenyl, tolyl, ethylphenyl, cumyl, hexylphenyl, xylyl, cymyl, mesityl, triethylphenyl, biphenyl, indenyl, naphthyl, methylnaphthyl, etc., and where R' is a short chain alkyl radical such as methyl, ethyl, propyl, butyl, amyl, etc.

The keto-esters of this invention are chiefly high melting solids and are useful as plasticizers of cellulose nitrate.

The trans isomers of the new keto-esters are particularly useful in the preparation of "trans-bicyclic ketones," i. e. compounds of the structural formula

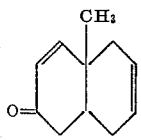

which "trans-bicyclic ketones" are important intermediates in the total synthesis of steroids having cortisone-like activity (J. A. C. S., vol. 74, September, 1952, p. 4223ff). The preparation thereof may be represented by the following general equations wherein R and R' have the same significance as aforedescribed

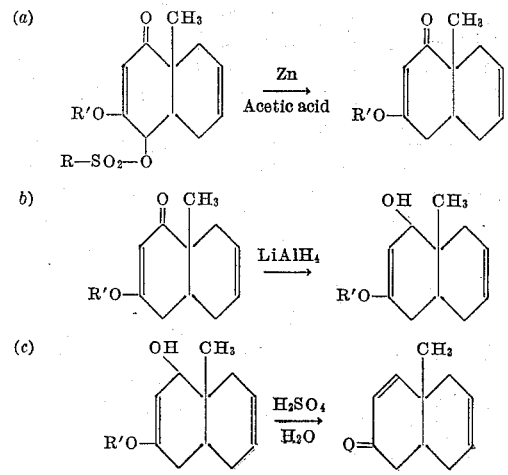

The products, namely the trans-2-alkoxy-4-keto-4a-methyl-1,4,4a,5,8,8a-hexahydronaphthalenes, of the reductive deacylation of the keto-ester (Equation a) are described and claimed in co-pending application Serial No. 325,703, filed December 12, 1952 of A. J. Speziale. The products, namely the trans-2-alkoxy-4-hydroxy-4a-methyl-1,4,4a,5,8,8a-hexahydronaphthalenes, of of the reduction of the carbonyl group of the trans-2-alkoxy-4-keto-4a-methyl-1,4,4a,5,8,8a-hexahydronaphthalene (Equation b) are disclosed and claimed in co-pending application Serial No. 326,159, filed December 15, 1952 of A. J. Speziale.

It will be obvious to those skilled in the art that the new compounds of this invention contain three optically active carbon atoms. As a result thereof, these compounds may exist in eight optically active isomeric forms or four racemates. All such forms of the new esters are contemplated as coming within the scope of this invention. The terms "cis" and "trans" as used in the specification indicated the spacial configuration of the CH3 group and H at positions 4a and 8a, respectively, in the structural formula. Where the name of the ester represents the unresolved mixture of isomers the notation "unresolved" will be used. However, it is to be understood that where no notation appears with the name of the ester that the name is to be interpreted in its generic sense, i. e., as representing the individual isomers in separated form as well as the racemic mixtures thereof or the total unresolved mixture of isomers.

As illustrative of the new compounds and the preparation thereof is the following.

*Example I*

To a suitable reaction vessel containing 30.0 parts by weight (substantially 0.144 mols) of dl-trans-1-hydroxy-4-keto-2-methoxy-4a-methyl-1,4,4a,5,8,8a-hexahydronaphthalene and approximately 80 parts by weight of pyridine is slowly added with agitation 30.5 parts by weight (substantially 0.16 mols) of para-toluenesulfonyl chloride while maintaining the temperature at 0–5° C. The mix is allowed to stand for about 22 hours at room temperature and then poured into 200 parts by weight of ice cold water and the cooled mix so obtained filtered. Approximately 36.3 parts by weight of a white solid identified as dl-trans-1-p-tosyloxy-4-keto-2-methoxy-4a-methyl-1,4,4a,5,8,8a-hexahydronaphthalene possessing a melting point of 145–146° C. is obtained.

*Example II*

Employing the procedure of Example I but replacing para-toluenesulfonyl chloride with an equimolecular amount of ortho-toluenesulfonyl chloride substantially pure *dl*-trans-1-o-tosyloxy-4-keto-2-methoxy-4*a*-methyl - 1,4,4*a*,5,8,8*a*-hexahydronaphthalene is obtained in an excellent yield.

*Example III*

Employing the procedure of Example I but replacing para-toluenesulfonyl chloride with an equimolecular amount of benzene sulfonyl chloride substantially pure *dl*-trans-1-benzenesulfonyloxy - 4 - keto - 2 - methoxy - 4*a* - methyl - 1,4,4*a*,5,8,8*a* - hexahydronaphthalene is obtained in an excellent yield.

*Example IV*

In accordance with the procedure of Example I an excellent yield of unresolved 1-p-phenyl-benzenesulfonyloxy-4-keto-2-methoxy-4*a*-methyl-1, 4,4*a*,5,8,8*a*-hexahydronaphthalene is obtained employing the following reactants

| | Parts by weight |
|---|---|
| Unresolved 1-hydroxy-4-keto -2- methoxy- 4*a* - methyl -1,4,4*a*,5,8,8*a*-hexahydronaphthalene | 4.2 |
| Para-phenyl benzenesulfonyl chloride | 5.6 |
| Pyridine | 20.0 |

*Example V*

In accordance with the procedure of Example I an excellent yield of *dl*-trans-1-(o-xylene-4-sulfonyloxy)-4-keto-2-n-butoxy-4*a*- methyl - 1,4, 4*a*,5,8,8*a*-hexahydronaphthalene is obtained employing the following reactants

| | Parts by weight |
|---|---|
| *dl*-Trans-1-hydroxy-4-keto-2-n-butoxy -4*a*-methyl-1,4,4*a*,5,8,8*a* - hexahydronaphthalene | 6.3 |
| Ortho-xylene-4-sulfonyl chloride | 9.3 |
| Pyridine | 25.0 |

*Example VI*

In accordance with the procedure of Example I an excellent yield of unresolved 1-(p-xylene-2-sulfonyloxy) - 4 - keto - 2 - ethoxy - 4*a* - methyl-1,4,4*a*,5,8,8*a* - hexahydronaphthalene is obtained employing the following reactants

| | Parts by weight |
|---|---|
| Unresolved 1-hydroxy-4-keto-2-ethoxy-4*a*-methyl-1,4,4*a*,5,8,8*a* - hexahydronaphthalene | 2.5 |
| Para-xylene-2-sulfonyl chloride | 4.2 |
| Pyridine | 20.0 |

*Example VII*

In accordance with the procedure of Example I an excellent yield of unresolved 1-(naphthalene-β-sulfonyloxy)-4-keto-2-methoxy-4*a*-methyl-1,4, 4*a*,5,8,8*a*-hexahydronaphthalene is obtained employing the following reactants

| | Parts by weight |
|---|---|
| Unresolved 1-hydroxy-4-keto - 2 - methoxy - 4*a*-methyl-1,4,4*a*,5,8,8*a* - hexahydronaphthalene | 2.1 |
| Naphthalene-β-sulfonyl chloride | 2.5 |
| Pyridine | 15.0 |

*Example VIII*

In accordance with the procedure of Example I an excellent yield of unresolved 1-mestiylene sulfonyloxy-4-keto-2-n-propoxy-4*a*-methyl-1,4,4*a*,5, 8,8*a*-hexahydronaphthalene is obtained employing the following reactants

| | Parts by weight |
|---|---|
| Unresolved 1-hydroxy-4-keto-2-n-propoxy-4*a*-methyl-1,4,4*a*,5,8,8*a* - hexahydronaphthalene | 4.4 |
| Mesitylene sulfonyl chloride | 4.8 |
| Pyridine | 25.0 |

*Example IX*

In accordance with the procedure of Example I an excellent yield of *dl*-trans-1-p-tosyloxy-4-keto-2-ethoxy - 4*a* - methyl-1,4,4*a*,5,8,8*a*-hexahydronaphthalene is obtained employing the following reactants

| | Parts by weight |
|---|---|
| *dl*-Trans-1-hydroxy-4-keto - 2 - ethoxy-4*a*-methyl-1,4,4*a*,5,8,8*a* - hexahydronaphthalene | 5.0 |
| Para-toluene sulfonyl chloride | 4.2 |
| Pyridine | 20.0 |

*Example X*

In accordance with the procedure of Example I an excellent yield of *dl*-cis-1-p-cumenesulfonyloxy-4-keto-2-methoxy - 4*a* - methyl-1,4,4*a*,5,8,8*a*-hexahydronaphthalene is obtained employing the following reactants

| | Parts by weight |
|---|---|
| *dl* - cis - 1 - hydroxy-4-keto-2-methoxy- 4*a* - methyl-1,4,4*a*,5,8,8*a* - hexahydronaphthalene | 4.2 |
| Para-cumene sulfonyl chloride | 4.8 |
| Pyridine | 30.0 |

*Example XI*

In accordance with the procedure of Example I an excellent yield of *d*-trans-1-benzenesulfonyloxy - 4 - keto -2- ethoxy-4*a*-methyl-1,4,4*a*,5,8,8*a* - hexahydronaphthalene is obtained employing the following reactants

| | Parts by weight |
|---|---|
| *d* - Trans - 1 - hydroxy-4-keto-2-ethoxy-4*a* - methyl-1,4,4*a*,5,8,8*a* - hexahydronaphthalene | 2.8 |
| Benzene sulfonyl chloride | 2.0 |
| Pyridine | 20.0 |

*Example XII*

In accordance with the procedure of Example I an excellent yield of *l*-trans-1-(cymene-3-sulfonyloxy)-4-keto-2-pentoxy-4*a*-methyl - 1,4,4*a*,5, 8,8*a*-hexahydronaphthalene is obtained employing the following reactants

| | Parts by weight |
|---|---|
| *l* - Trans - 1 - hydroxy-4-keto-2-pentoxy-4*a*-methyl - 1,4,4*a*,5,8,8*a*,hexahydronaphthalene | 1.0 |
| Cymene-3-sulfonyl chloride | 1.4 |
| Pyridine | 10.0 |

In addition to the esters prepared in the preceding examples, the following examples are further illustrations of compounds coming within the scope of this invention:

1(p-xylene-2-sulfonyloxy)-4-keto - 2 - methoxy-4*a*-methyl - 1,4,4*a*,5,8,8*a* - hexahydronaphthalene 1(o-xylene-4-sulfonyloxy)-4-keto - 2 - methoxy-4*a*-methyl - 1,4,4*a*,5,8,8*a* - hexahydronaphthalene 1(naphthalene-β-sulfonyloxy)-4 - keto - 2 - ethoxy - 4*a* - methyl - 1,4,4*a*,5,8,8*a* - hexahydronaphthalene 1(naphthalene-α-sulfonyloxy)-4-keto-2 - methoxy - 4a - methyl - 1,4,4a,5,8,8a - hexahydronaphthalene 1-p-tosyloxy-4-keto-2 - isopropoxy-4a - methyl-1,4,4a,5,8,8a-hexahydronaphthalene 1-mesitylene-sulfonyloxy-4-keto-2 - n - butoxy-4a - methyl - 1,4,4a,5,8,8a - hexahydronaphthalene 1-o-phenyl benzenesulfonyloxy-4-keto-2-methoxy - 4a - methyl - 1,4,4a,5,8,8a - hexahydronaphthalene 1-p-tosyloxy-4-keto-2-isobutoxy-4a-methyl - 1,4,4a,5,8,8a-hexahydronaphthalene 1-p-tert. butyl benzenesulfonyloxy-4 - keto - 2 - methoxy - 4a - methyl - 1,4,4a,5,8,8a - hexahydronaphthalene The keto-alcohol reactants employed in the preparation of the new keto-esters are readily prepared by partially reducing the corresponding 1,4-diketo compound, as for example by reacting a mixture comprising zinc dust, acetic acid and a 1,4-diketo compound of the formula

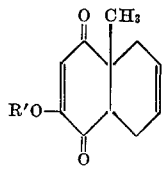

where R' has the same significance as aforedescribed. Such 1,4-diketo compounds are well known compounds and many are important intermediates in the total synthesis of steroids having cortisone-like activity (J.A.C.S. Vol. 74, p. 4223ff, September 1952).

Although the preceding examples have described certain specific embodiments of this invention both as to the nature of the novel esters and their method of preparation, it is to be understood that substantial variations obvious to those skilled in the art in the reactants and reaction conditions, e. g. reaction temperatures of from −10° C. to reflux temperatures may be used, etc., set forth above may be made without departing from the spirit or scope of this invention.

What is claimed is:

1. As new compounds esters of the structural formula

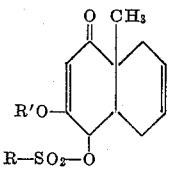

where R is an aromatic hydrocarbon radical and where R' is a short chain alkyl radical.

2. As new compounds esters of the structural formula

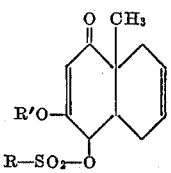

where R' is a short chain alkyl radical and where R is a benzenoid hydrocarbon radical.

3. The trans isomers of the esters of claim 2.

4. As new compounds esters of the structural formula

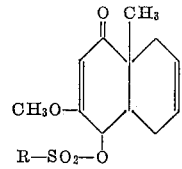

where R is a benzenoid hydrocarbon radical.

5. The trans isomers of the esters of claim 4.

6. As new compounds esters of the structural formula

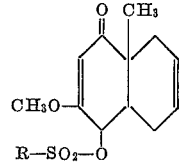

where R is a tolyl radical.

7. 1 - (p - tosyloxy) - 4 - keto - 2 - methoxy-4a - methyl - 1,4,4a,5,8,8a - hexahydronaphthalene.

8. 1 - (o - tosyloxy) - 4 - keto - 2 - methoxy-4a - methyl - 1,4,4a,5,8,8a - hexahydronaphthalene.

9. 1-benzenesulfonyloxy-4-keto - 2 - methoxy-4a - methyl - 1,4,4a,5,8,8a - hexahydronaphthalene.

10. dl-Trans-1-(p-tosyloxy)-4-keto-2 - methoxy - 4a - methyl - 1,4,4a,5,8,8a - hexahydronaphthalene.

11. The process of making the esters of claim 2 which comprises reacting a keto-alcohol of the formula

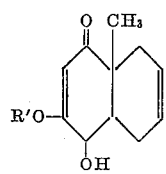

where R' is a short chain alkyl radical and a benzenoid hydrocarbon sulfonyl chloride in pyridine.

12. The process of making the esters of claim 4 which comprises reacting 1-hydroxy-4-keto-2-methoxy - 4a - methyl - 1,4,4a,5,8,8a - hexahydronaphthalene and a benzenoid hydrocarbon sulfonyl chloride in pyridine.

13. The process of making the ester of claim 7 which comprises reacting 1-hydroxy-4-keto-2-methoxy-4a-methyl - 1,4,4a,5,8,8a - hexahydronaphthalene and p-toluene sulfonyl chloride in pyridine.

14. The process of making the ester of claim 10 which comprises reacting dl-trans-1-hydroxy-4 - keto - 2 - methoxy - 4a - methyl - 1,4,4a,5,8,8a-hexahydronaphthalene and p-toluene sulfonyl chloride in pyridine.

References Cited in the file of this patent

UNITED STATES PATENTS

| Number | Name | Date |
|---|---|---|
| 2,373,298 | Dougherty et al. | Apr. 10, 1945 |